(12) United States Patent
Plass et al.

(10) Patent No.: US 6,851,946 B1
(45) Date of Patent: Feb. 8, 2005

(54) HOT RUNNER DISTRIBUTOR SYSTEM

(75) Inventors: Werner Plass, Eschborn (DE); Stefan Ruf, Auringen (DE)

(73) Assignee: MHT Mold & Hotrunner Technology AG, Hochheim am Main (DE)

( * ) Notice: Subject to any disclaimer, the term of this patent is extended or adjusted under 35 U.S.C. 154(b) by 174 days.

(21) Appl. No.: 10/130,968

(22) PCT Filed: Nov. 4, 2000

(86) PCT No.: PCT/DE00/03889

§ 371 (c)(1),
(2), (4) Date: Oct. 23, 2002

(87) PCT Pub. No.: WO01/38067

PCT Pub. Date: May 31, 2001

(30) Foreign Application Priority Data

Nov. 24, 1999  (DE) ......................................... 199 56 554

(51) Int. Cl.[7] .............................................. B29C 45/27
(52) U.S. Cl. ........................ 425/572; 425/573; 425/588
(58) Field of Search ................................ 425/547, 567, 425/572, 573, 588; 264/328.8, 328.14

(56) References Cited

U.S. PATENT DOCUMENTS

| | | | |
|---|---|---|---|
| 3,812,228 A | * 5/1974 | Skoroszewski | 264/54 |
| 5,705,202 A | * 1/1998 | Gellert | 425/549 |
| 5,707,664 A | 1/1998 | Mak | 425/549 |

FOREIGN PATENT DOCUMENTS

DE            3501840          7/1986

* cited by examiner

Primary Examiner—James P. Mackey
Assistant Examiner—Donald Heckenberg
(74) Attorney, Agent, or Firm—Michael L. Dunn (57) ABSTRACT

A hot runner manifold system for an injection mould for simultaneous injection moulding of several parts or of large parts, having a multiplicity of injection orifices (24). The orifices are designed for delivering injection moulding compound substantially simultaneously under high pressure and at high temperatures into specified mould zones. The mould zones are provided at least partially on main manifolds (11, 12, 13, 14) that are separated from one another, which main manifolds have hot runners (17, 19, 21, 23) and are connected via at least one pre-manifold (2). The pre-manifold has hot runners (4, 7), and is connected to a sprue (1) for receipt of the injection moulding compound. At least one part of pre-manifold (2) is arranged between adjacent main manifolds (11, 12, 13, 14), with the hot runners (7, 17) of the pre-manifold (2) and of the main manifolds (11, 12, 13, 14) opening through lateral surfaces of pre-manifold (15) and a main manifold (25) that face one another and are in contact with one another, with the main manifolds (11, 12, 13, 14) and pre-manifolds (2) pressed together firmly and tightly at the lateral surfaces by lateral spring elements (6). The spring elements (6) permit a limited movement of the main manifolds (11, 12, 13, 14) by overcoming the force of a spring element (6). Desirably at least two separate main manifolds are provided which are arranged on opposite long sides of an oblong pre-manifold (2).

12 Claims, 6 Drawing Sheets

HOT RUNNER DISTRIBUTOR SYSTEM

BACKGROUND OF THE INVENTION

The present invention relates to a hot runner manifold system for an injection mould for simultaneous injection moulding of several parts or of large parts with a multiplicity of injection nozzles or orifices, which are designed for delivering injection moulding compound substantially simultaneously under high pressure and at high temperatures into specified mould regions, the mould regions being provided with main manifolds that are at least partially separated from one another, which have hot runners and are connected via pre-manifolds, which in turn have hot runners, with one another and with a sprue for the injection moulding compound.

Corresponding hot runner manifold systems and injection moulds have long been known in the state of the art, and corresponding injection moulds are known in particular as moulds for the production of blanks of PET bottles, i.e. of preforms, which consist of PET tubes that are initially relatively thick-walled, and can have very varied shapes, have a relatively small volume and are moulded identically in every respect. The present invention relates in particular to the said hot runner manifold systems for injection moulds for the production of PET blanks, but it can also be applied directly for hot runner manifold systems for other injection moulds, especially if these are intended for the production of a large number of identical parts in one mould or alternatively are designed for the production of very large moulds with a multiplicity of injection nozzles or orifices.

In accordance with the size and large number of parts that can be made with moulds of this kind, the hot runner manifold systems for these moulds are relatively large and heavy. So that, in the case of several products of the same kind, all the mouldings produced have the same quality and finish, it is necessary for the conditions to be exactly the same, i.e. same temperature and same pressure of the injection moulding compound, at all injection nozzles or orifices during injection of the moulding compound. This means, in turn, that there must be the minimum possible loss of temperature and pressure of the moulding compound on its path to the injection orifices. Furthermore, the paths of the moulding compound from a sprue that is connected directly to a storage tank or the like for the moulding compound, as far as the injection orifices or nozzles, should as far as possible be of identical design and as equal as possible in length.

Another problem when using large injection moulds for correspondingly large parts or for a correspondingly large number of individual, smaller parts is that of thermal expansion, which necessarily affects the individual elements of the mould and of the feed systems or pre-manifolds for the molten injection moulding material. Cooling is only possible to a limited extent, because if cooling were excessive there could be local solidification of the injection moulding material, so that runners or injection nozzles could become clogged. Instead, in many cases injection nozzles are even actively heated, so that premature solidification of the moulding material leaving the nozzles is always prevented. The temperature of the injection material can be in the range from 200 to 300° C., so that on account of the large temperature difference relative to room temperature the thermal expansion is appreciable and cannot be prevented completely even by using materials with low thermal expansion. This is one of the reasons why these large moulds are made in several parts, without a rigid connection between the individual mould parts and the corresponding, associated main manifolds, instead they are only fixed at one or a few points and with a clearance between them, so that the thermal expansion of one main manifold does not affect the position of another, adjacent main manifold.

For the same reason, the individual main manifolds and the feeder systems, i.e. the previously mentioned pre-manifolds, have until now been arranged in different planes. Because, on the one hand, the individual main manifolds are supplied with the injection moulding material from a central sprue and to the extent that they must be connected to each other indirectly via pre-manifolds, but rigid connection in the same plane would lead to correspondingly large relative displacements of main manifolds located at a distance from one another, so until now the individual main manifolds have been arranged relative to one another in a first plane and with a clearance from one another without rigid connection, and a pre-manifold was arranged in a plane above or below, and this pre-manifold was for its part connected to a sprue arranged in a further plane above or below. Thermal expansion of the moulds and of the pre-manifolds then only leads to comparatively small mutual effects on one another, because the corresponding parts, arranged in different planes, only have relatively small dimensions in the direction perpendicular to the planes in which they are arranged, so that the absolute changes in thickness still remain within a manageable range even with quite large thermal loads. Usually, in the state of the art, pre-manifolds and the underlying mould parts are bolted together, with bolts passing through slots, and in the cold state the pre-manifolds and moulds are held together by the bolts with little clearance and the mould parts and the pre-manifolds can still be displaced in the direction perpendicular to the bolt extension when there is corresponding heating, because the bolts, as already mentioned, are housed in corresponding slots, which permit such a displacement transversely to the bolts. The clearance between the mating surfaces of the pre-manifolds and of the corresponding main manifolds can be kept small enough so that even in a still not completely hot state of the mould, the relatively highly viscous injection moulding material cannot penetrate into corresponding sealing gaps.

However, this arrangement of main manifolds and pre-manifolds one above the other means that overall the mould becomes relatively bulky and heavy, especially as the mould must generally be fixed in a corresponding machine and must be provided with corresponding connections, and the corresponding holders or seatings and connections for the mould must be adapted to its shape. On account of the relatively large mass of the main manifolds and of the pre-manifolds including all associated components, corresponding heating power is also required, for heating the whole system to a required temperature and maintaining it at this temperature. The corresponding injection moulding machines therefore become relatively large and heavy overall, require corresponding machine foundations and, especially when these main manifolds and pre-manifolds must also still be movable, they require correspondingly large and heavy machine drives.

BRIEF DESCRIPTIONS OF THE INVENTION

Relative to this state of the art, the present invention is based on the problem of creating an injection mould with the features stated at the beginning, which avoids at least some of the aforementioned disadvantages, and so is, in particular, lighter and less bulky.

This problem is solved in that at least a part of the pre-manifolds is arranged between adjacent main manifolds, with the hot runners of the pre-manifolds and of the main manifolds opening in the lateral surfaces facing one another and with the main manifolds and pre-manifolds being pressed firmly and tightly together by lateral spring elements, with the spring elements permitting a limited movement of the main manifolds on overcoming the spring force.

DETAILED DESCRIPTION OF THE INVENTION

In contrast to the state of the art, in which the pre-manifolds are arranged above or below the main manifolds, according to the invention a pre-manifold is arranged in the same plane as the main manifolds and between them. As a result, the individual main manifolds are indeed coupled together more or less rigidly by the pre-manifold, at least in one direction, but these parts are only pressed together by spring elements, so that the parts remain movable at least to the extent that they are not hampered in their thermal expansion.

As the spring elements each act for example on the exteriors of two main manifolds, between which a corresponding pre-manifold is located, so that both main manifolds are pressed against this pre-manifold, thermal expansion can take place uniformly in both directions, with the proviso that the spring elements arranged on the opposite main manifolds are all of the same type and are present in equal number and are also arranged as symmetrically as possible. In the case of main manifolds that have different dimensions in two mutually perpendicular directions (in the plane of the main manifolds), it is preferable to arrange these and the interposed pre-manifold in such a way that the distance between the oppositely acting spring elements and the opposite sides of the main manifolds is as short as possible. If for example the main manifolds have an oblong shape, they will preferably be arranged with the long sides adjacent and parallel to each other, and a corresponding pre-manifold, which essentially also has an oblong shape, will be arranged in the longitudinal direction between the two main manifolds and positioned in such a way that transitional openings of the pre-manifolds and main manifolds (i.e. in the long sides of the main manifolds) are essentially aligned with one another or in any case become aligned with each other after corresponding thermal expansion of the main manifolds and pre-manifolds. In this way, the two main manifolds with the interposed pre-manifolds are arranged so that the distance between opposite spring elements is as short as possible, so that the thermal expansion in this direction and therefore the spring travel as well is minimal for a corresponding system.

The distance between the spring elements is even shorter in another preferred embodiment of the invention, in which the main manifolds have extensions or flanges at opposite ends and essentially aligned with their sides opposite one another, with the pre-manifold arranged between the sides that are opposite one another and the two main manifolds that are thus facing one another are held together by clamping bolts that act upon the lateral flanges. The flanges can be designed in such a way that, as a result of a certain deformation or bending, they provide a spring movement, even if ever so slight, but which may possibly be sufficient, owing to the slight distance of the flange, to compensate the thermal expansion of the pre-manifold between the main manifolds facing one another. As the pre-manifold has a dimension of just a few centimeters in this direction, its absolute thermal expansion in this direction is comparatively slight. If, however, deformation or bending of the flanges is not sufficient to compensate any relative movements perpendicular to the surfaces facing one another of the two opposite main manifolds, spring elements can be provided in the form of washers or disk springs, which are pushed onto the clamping bolts that act upon the flanges, or are inserted between the nut or bolt head and the flange.

With an oblong pre-manifold, several main manifolds can also be arranged on the same side of a pre-manifold behind one another, with the same number of main manifolds on the opposite side of an oblong pre-manifold.

Preferably the main manifolds and pre-manifolds are arranged inside a stable, surrounding frame, which serves as a support for the spring elements. Of course, other variants of supports are also possible, e.g. in the form of brackets, rings or the like. Even in conventional hot runner manifold systems, base plates or the like are provided anyway, and the pre-manifolds and main manifolds are supported on these or in recesses therein. It goes without saying that at least in some embodiments of the invention this base plate or retaining plate should be designed in such a way that one end of spring elements can bear against this plate. Thus, the aforementioned frame can for example be formed by an edge or projecting part of the holding plate.

Furthermore, in the preferred embodiment of the invention, it is stipulated that main manifolds that are essentially rectangular and have a longer and a shorter side have a through-hole on one of the long sides, centred relative to this side.

Furthermore, the pre-manifold should be a sliding fit in the longitudinal direction on the lateral surfaces of the main manifolds, with the adjacent surfaces of the pre-manifolds and of the main manifolds obviously being designed as plane, flat surfaces that ensure tight engagement without having to fit any seals or the like between the said surfaces. Tight engagement between the surfaces of the pre-manifolds and of the main manifolds is ensured by the springs, which press a main manifold against the interposed pre-manifold from both sides. Accordingly, no securing bolts or the like are required, that would have to hold the main manifolds and the pre-manifold together, and in particular there is no need to provide any clearance whatever, perpendicular to the adjacent surfaces of pre-manifold and main manifolds, because any thermal expansion in this direction is taken up by the spring elements. Obviously the overall height of such a system is substantially less than in the conventional moulds of a corresponding size, since the pre-manifold or several pre-manifolds are arranged in the same plane as the main manifold, so that the planes located above or below are not needed for pre-manifolds. Less stringent requirements also apply to the stability of the pre-manifolds, which are only clamped between two (or more) opposite main manifolds.

The ability to slide lengthwise means, moreover, that the pre-manifold, especially in the case of variants in which two or more main manifolds are arranged one after another on the longitudinal side of a pre-manifold, can be displaced to a varying extent on the sealing surfaces of individual main manifolds, because on account of its greater overall length in this direction it experiences an absolutely greater thermal expansion than the individual main manifolds, arranged one after another, which are not joined together rigidly. The pre-manifold can, for example, be fixed at a central point on a frame or a base plate, whereas the main manifolds are essentially only held by the springs, but for their part they can be fixed at least in the lengthwise direction of the pre-manifold by a stop or the like.

Expediently the individual main manifolds are constructed in such a way that their lateral through-holes are connected via a runner to the centre of the respective main manifold, from where further runners lead to the injection nozzles or orifices in such a way that the flow path from the centre of the main manifold to all injection nozzles or orifices is essentially of equal length. If in addition all the main manifolds are arranged symmetrically relative to the pre-manifold, this ensures that from the sprue to the individual injection nozzles, all flow paths to the various injection nozzles each have exactly the same length. This can be provided at least for four main manifolds, two of them being arranged in each case on either side of an oblong pre-manifold, provided with through-holes midway along their long sides which align with corresponding through-holes of the pre-manifold, these through-holes of the pre-manifold in turn being arranged symmetrically about a central sprue, via which the pre-manifold is supplied with the injection moulding material.

The present invention is designed in particular for moulds for making blanks or preforms of so-called PET bottles.

With an injection mould of this kind, for the blanks of PET bottles, it is especially preferred if the mould consists of at least two main manifolds that are separated from one another, and are connected to a common pre-manifold, each having at least two, preferably twenty-four or thirty-two injection orifices/nozzles per main manifold. The total number of blanks or PET preforms that can be produced in a single injection moulding operation with such a machine, is accordingly ninety-six, though with the machine design according to the invention even larger main manifolds can readily be produced or alternatively the number of main manifolds to be connected symmetrically with lateral sealing surfaces can be increased even further, if for example the pre-manifold is given an H shape.

Further advantages, characteristics and possible applications of the present invention will become clear from the following description of a preferred embodiment and from the accompanying figures.

Figure 1:
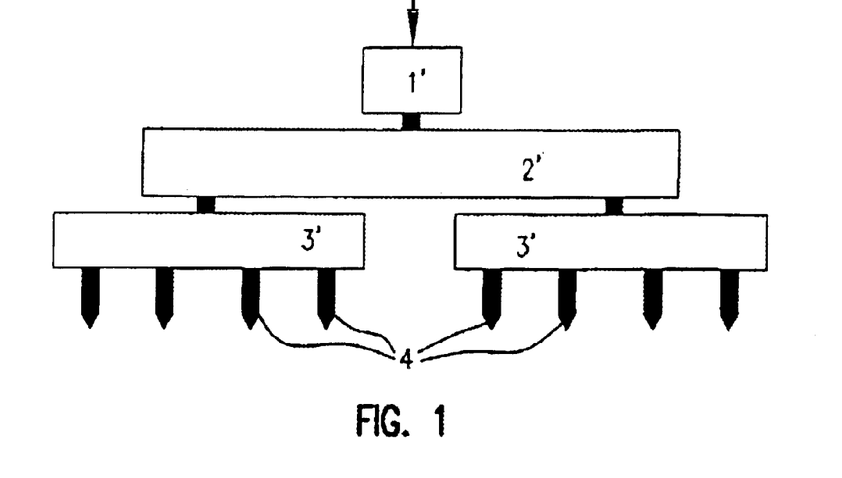
FIG. 1 shows a schematic representation of an injection mould for several parts according to the state of the art.

FIG. 1 shows two main manifolds, designated 3', each of which has several injection nozzles 4', it being possible for the actual number of injection nozzles 4' to be either smaller or substantially greater than shown here and it also being possible for at least two further, corresponding main manifolds to be fitted, apart from the two main manifolds 3', perpendicularly to the plane of the paper.

Both main manifolds 3' have a through-hole at the top, roughly in the centre of the main manifold 3', which appears rectangular when viewed from the top, and a pre-manifold 2' fitted above the main manifold 3 is arranged in such a way that its through-holes provided on the underside of pre-manifold 2' align with the corresponding through-holes of the main manifolds 3'. However, the through-holes of the pre-manifold and of the main manifolds, in the cold state, can be displaced relative to one another, with a precisely aligned position of the through-holes only arising as a result of the different thermal expansion of the longer pre-manifold 2' in comparison with the shorter main manifolds 3'.

For this purpose, the pre-manifold 2' and the main manifolds 3' are each joined together by bolts, which are passed through slots in pre-manifold 2' and which hold the pre-manifold 2' and the main manifolds 3' together at least in the cold state and with some clearance, permitting relative movement of the contacting surfaces of pre-manifold 2' and of the main manifolds 3'. For its part, pre-manifold 2' is joined at its centre to a sprue 1', i.e. a reservoir or supply connection for generally molten injection moulding material.

As can be seen, the main manifolds 3', the pre-manifold 2' and the sprue 1' are arranged one above the other in different planes and therefore have a relatively large overall height.

Figure 2:
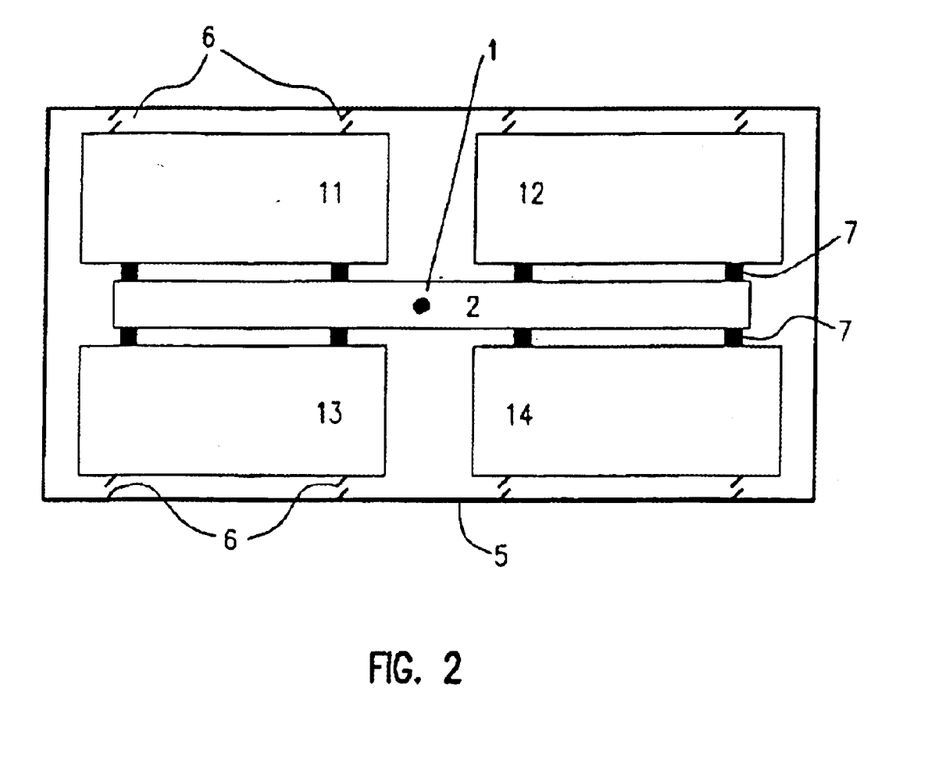
FIG. 2 shows a corresponding schematic diagram of an injection mould according to the invention.

In contrast, in the design according to the present invention, as shown schematically in FIG. 2, this time as a top view, the individual main manifolds 11, 12, 13 and 14 are arranged in the same plane as the pre-manifold 2. The individual main manifolds have an essentially oblong shape and their long sides are adjacent to the long sides of a narrow, oblong pre-manifold 2. Both the main manifolds and the pre-manifold have so-called "hot runners", which have a substantially cylindrical cross-section, through which the liquid injection compound flows. In a gate region (sprue) 1, the injection compound flows into the pre-manifold 2 and from there through the hot runner, not visible here, passing longitudinally through pre-manifold 2, and via transition openings into the individual main manifolds 11, 12, 13 and 14. In the present case, two transition zones or through-channels 7 are shown in each case between the individual main manifolds and the pre-manifold 2, but this is only a schematic representation, and in practice only a single transition channel will be used instead, which is provided centrally in the long side of each of the main manifolds, with a corresponding runner and a through-hole in a corresponding position on pre-manifold 2. In each case, two pairs of main manifolds 11, 13 and 12, 14 arranged on opposite sides of pre-manifold 2 are pressed firmly against pre-manifold 2 from both sides by spring elements 6, the springs for their part being supported in a stable frame or a base plate 10, which has corresponding recesses for receiving the main manifolds and the pre-manifold.

Further details of the preferred embodiments are given in the following description of FIGS. 3 to 6, which show somewhat more realistic representations of the injection mould according to the invention.

Figure 3:
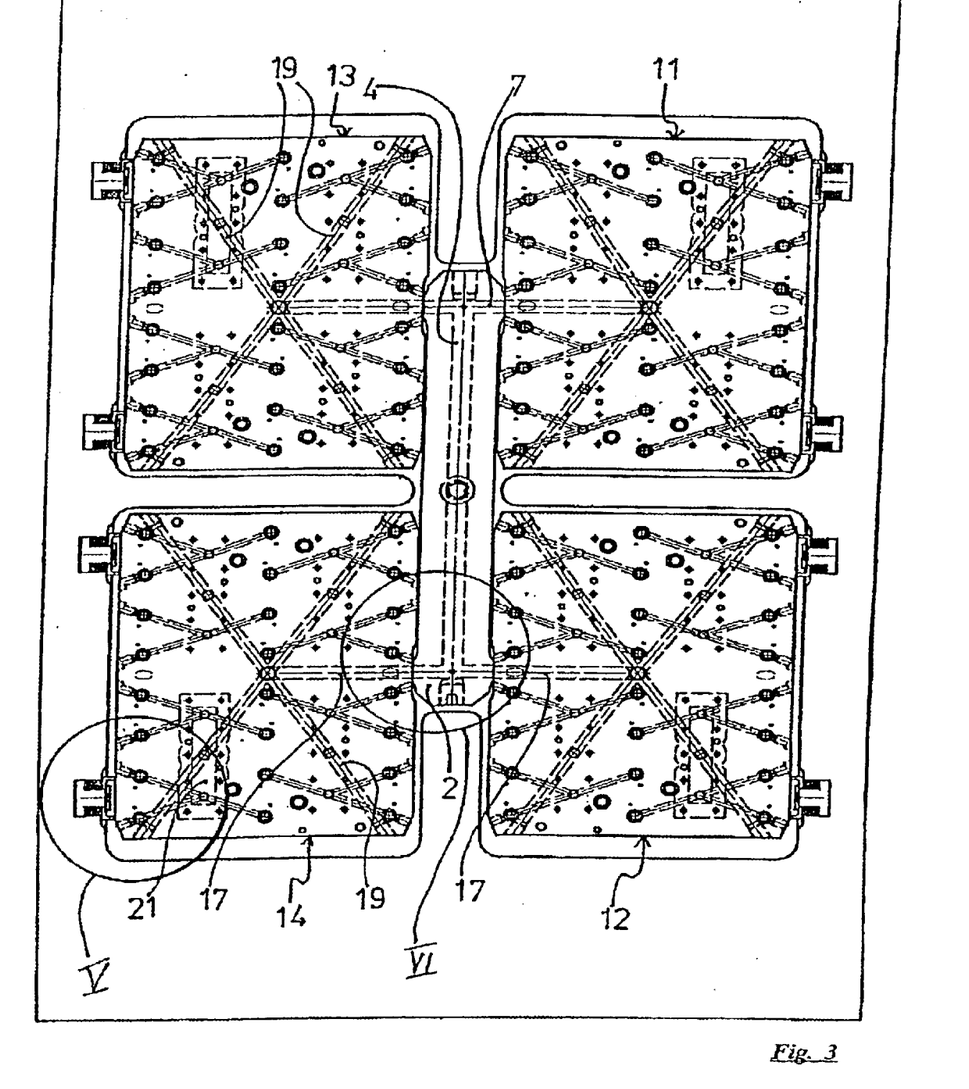
FIG. 3 shows a general view of an injection mould constructed according to the schematic diagram in FIG. 2 with essentially realistic proportions and runner arrangements.

As can be seen from FIG. 3, the individual main manifolds 11, 12, 13 and 14 once again have a substantially rectangular shape, though not so elongated as in the schematic diagram in FIG. 2. In each case, two main manifolds 11, 12 and 13, 14 are arranged one after another in the lengthwise direction on the same side of a pre-manifold 2, the latter being dimensioned in such a way that its through-channels 7 arranged at each end of pre-manifold 2 align substantially with a through-channel 17 of the individual main manifolds, which again joins the middle of the long side of each of the main manifolds. The pre-manifold has a central hot runner 4 running longitudinally, which is connected at its opposite ends with the aforementioned cross-channel 7, which in its turn aligns with the aforementioned through-channels of the main manifolds. At the centre of pre-manifold 2 we can see a sprue, into which the molten injection moulding material flows. Main manifolds 11, 13 and 12, 14 arranged in each case on opposite sides of pre-manifold 2 abut, with their side away from the pre-manifold, against spring elements 6, which are supported in recesses in a frame 10.

Figure 4:
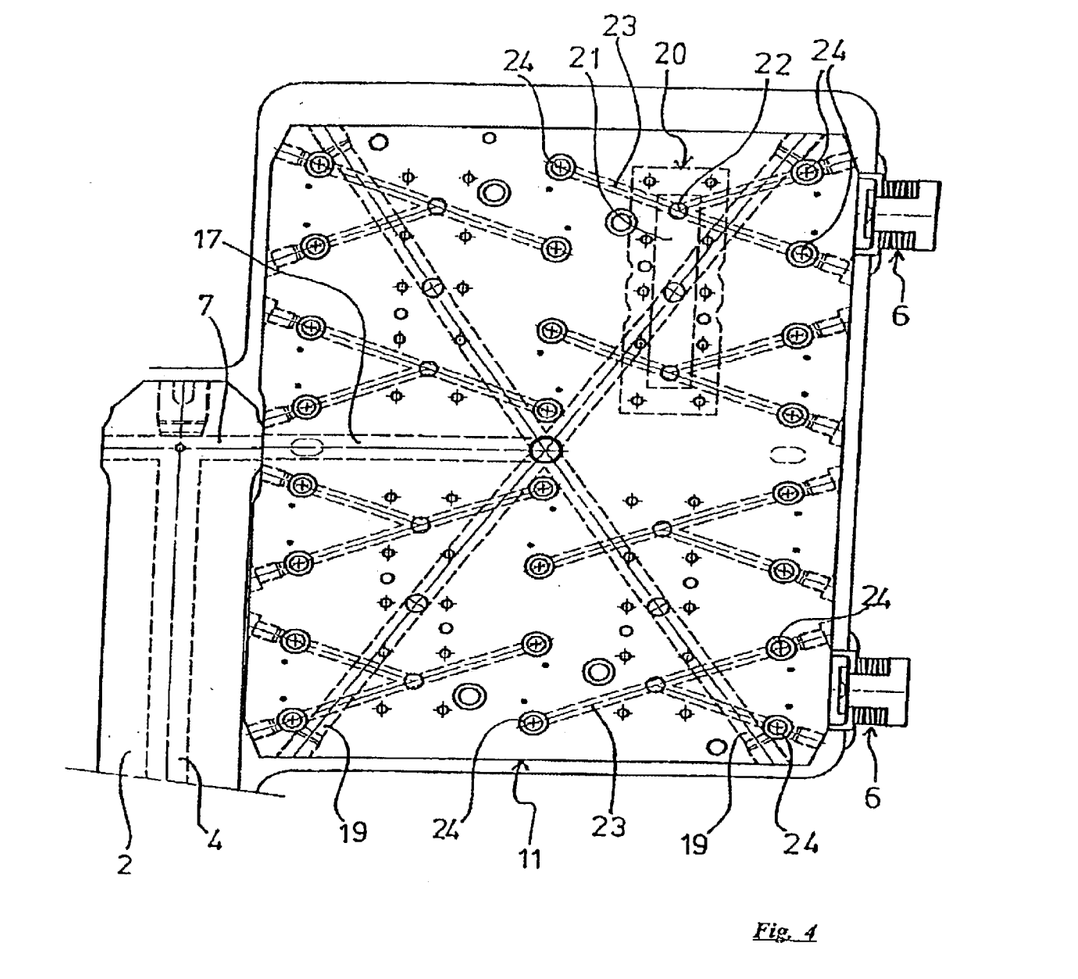
FIG. 4 shows a partial section from FIG. 3, showing the main manifold 11.

FIG. 4 shows, as an example, the main manifold 11 from FIG. 3. Once again we can see a part of the pre-manifold 2 with the central hot runner 4 and the transverse hot runner or through-channel 7, which aligns with the corresponding runner 17 in the main manifold 11. This hot runner 17 leads to the centre of main manifold 11, which essentially has the shape of a thick, rectangular plate. This plate has two diagonal holes 19, which cross each other in the centre of main manifold 11 and are connected there to the through-channel 17. The top right-hand part of FIG. 4 also shows a screwed-on external pre-manifold 20, which has a hot runner 21 that runs essentially lengthwise, i.e. parallel to the hot runner 4 of pre-manifold 2 and is connected to one of the diagonal channels 19. From there, the internal hot runner 21 leads to connectors 22 and via channels 23 to the injection nozzles or orifices 24, all of which have the same length as measured from the supply point 22. The two supply openings 22 provided on each pre-manifold 20 are also at the same distance from the central connection of this pre-manifold 20 on the diagonal channel 19, and from there the flow paths via channels 19, 17, 7 and 4 are once again of equal length for all material streams.

On the right-hand edge of FIG. 4 and on the side of the main manifold 11 opposite the pre-manifold 2, we can see two spring assemblies 6 in the form of stacks of disk springs, which are held on a core, supported in its turn in a recess of a holding frame or holding plate.

Figure 5:
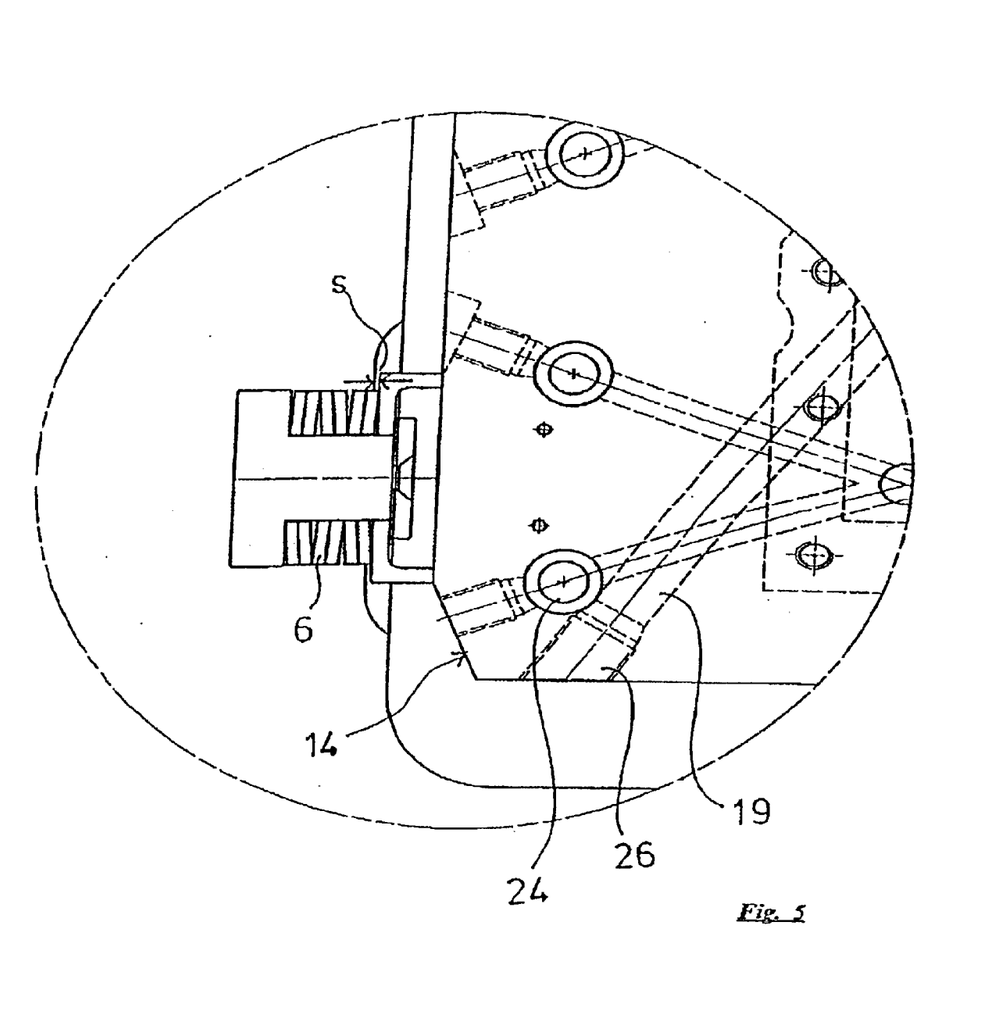
FIG. 5 shows an enlarged detail of the portion in circle V in FIG. 3.

FIG. 5 shows an enlarged section of the main manifold according to the invention, from the region marked with circle V in FIG. 3. Details of spring assembly 6 are shown once more, as well as the clearance s that is available for movement of main manifold 14 on account of its thermal expansion. As can be seen, the required clearance is comparatively small, though nevertheless significant, so that the resulting movements can only be compensated by a spring element. Of course, this need not necessarily be a stack of disk springs 6, but could just as well be provided by coil springs, hydraulic spring elements or compressed-air springs or other pneumatic springs. The design according to the invention with a stack of disk springs is, however, particularly compact and simple.

Figure 6:
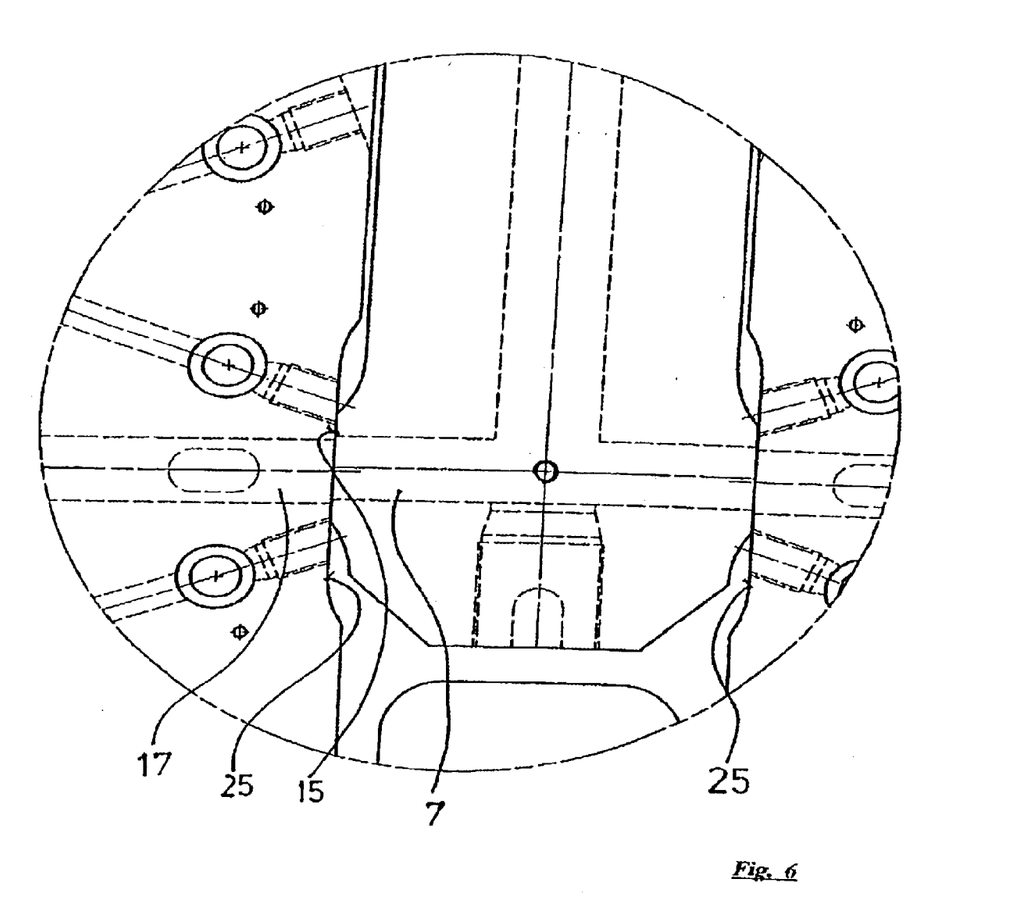
FIG. 6 shows an enlarged detail of the portion shown in circle VI in FIG. 3.

FIG. 6 shows the side opposite the spring assemblies, of a main manifold in the region of the transition channels 7, 17.

Channels 7, 17 open into flat sealing surfaces 15 and 25 respectively, with a flat surface 15 provided on a slightly projecting part laterally at the end of the pre-manifold, and the flat surface 25 is provided on a slightly recessed part of main manifold 14, though an offset region does not necessarily have to be provided here. The only essential point is that the pre-manifold 2 and the main manifolds do not lie adjacent and rub against one another on their entire long side or on a large part of these long sides, but that this friction contact, which is at the same time also a sealing contact of the corresponding flat surfaces 15, 25, takes place in limited, precisely defined regions.

As can be seen from FIG. 6, the through-channels 7 and 17 of pre-manifold 2 and of main manifold 14 are not precisely aligned with one another. FIG. 6 therefore shows the system in the cold state. Thus, when on account of the hot injection compound and possibly also on account of additional heating the pre-manifold and the main manifolds 11 to 14 are heated to their normal operating temperature, the pre-manifold 2, even if it is made of the same material as the main manifolds 11 to 14, expands more than the main manifolds in absolute terms, because it is longer than the main manifolds and is fixed at the mid-point, whereas the main manifolds can optionally be secured at one or other end or in the middle against further lengthwise displacement, and therefore are displaced in the region of the through-holes only slightly, not at all or even in the opposite direction to the thermal displacement of the transition zone of pre-manifold 2. As soon as all the parts have reached their normal operating temperature, the alignment error that can still be seen in FIG. 6 is compensated.

Of course, surfaces 15 and 25 are also dimensioned in the lengthwise direction of the pre-manifold 2 in such a way that they readily permit corresponding relative movements resulting from differences in thermal expansion.

Figure 7:
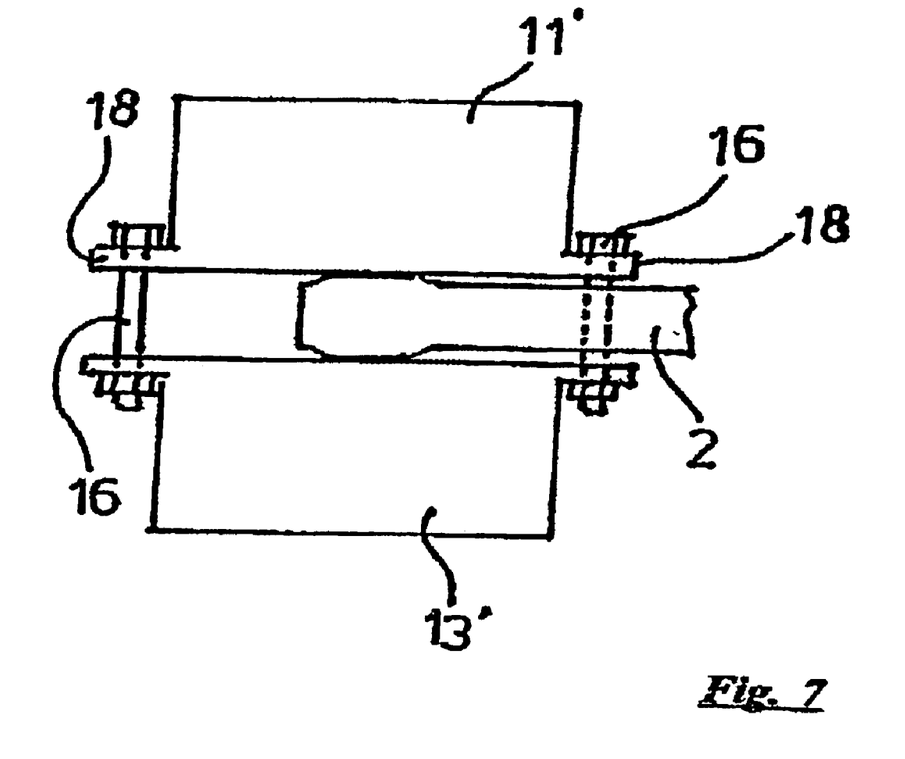
FIG. 7 shows a schematic representation of an alternative embodiment, in which the main manifolds are held together by clamping bolts, which engage with flanges of the main manifolds.

FIG. 7 shows another, alternative embodiment of the invention, in which spring assemblies 6 are not provided on the outside of the main manifolds, but in which clamping bolts 16 are provided instead, which hold the main manifolds 11' and 13' together by engaging on flanges 18. Flanges 18 are in practice extensions of one of the long sides of the main manifolds 11' and 13', i.e. of the sides that also have the through-hole 17 for connection to the pre-manifold 2. Flanges 18 each have a hole, which can also be provided in the form of a slot, and a bolt 16 passes through the aligned holes of the flanges of opposite main manifolds 11' and 13' and is secured by a nut that is screwed onto the end of the bolt, uniformly on both sides, so that the surfaces 25, 15 of the main manifolds 11, 13 and of pre-manifold 2 fit together smoothly and tightly. When hot injection material flows in through the pre-manifold 2 and into the main manifolds 11' and 13', the pre-manifold 2 essentially expands evenly in all directions, but because it only has relatively small dimensions in the direction perpendicular to the sides 25 facing one another of the main manifolds 11' and 13', these two surfaces 25 will only be forced apart to a slight extent, and flanges 18 can be designed to be sufficiently elastic to absorb this slight thermal movement so that no additional spring elements are required. Optionally, however, it would be possible for disk springs or other spring elements to be pushed onto bolts 16 and arranged between the bolt head or nut and the respective flange 18.

On the right-hand sides in FIG. 7, the bolt 16 can either pass along the outside of the pre-manifold 2, or it can pass through a hole in pre-manifold 2, arranged of course in such a way that it does not meet the slot 4 in pre-manifold 2 and so does not disturb the flow of material in pre-manifold 2. If necessary, pre-manifold 2 could also be made as a part that is developed slightly from the plane of the paper, so that bolt 16 can indeed be arranged on the one hand relative to the contact surfaces between pre-manifold and main manifold symmetrically to the opposite bolt 16, but on the other hand the flow channel 4 in pre-manifold 2 can pass through the latter substantially centrally. It can also be seen that all the hot runners are made in the form of through-holes, whose ends are closed by plugs 26 that are screwed in and fitted with gaskets, unless they open into corresponding through-holes.

Leads and circuits for any additional heating systems and cooling channels are not shown. Generally a coolant, e.g. water, flows through the cooling channels, in order to prevent excessive heating and in particular any uneven heating of different mould zones. However, they are not of notable importance for the present invention and therefore are not shown.

What is claimed is:

1. A hot runner manifold system for an injection mould for simultaneous injection moulding of several parts or of large parts, comprising a multiplicity of injection orifices (24), which are designed for delivering injection moulding compound substantially simultaneously under high pressure and at high temperatures into specified mould zones, the mould zones being provided at least partially on main manifolds (11, 12, 13, 14) that are separated from one another, which main manifolds have hot runners (17, 19, 21, 23) and are connected via at least one pre-manifold (2), which pre-manifold has hot runners (4, 7), to a sprue (1) for receipt of the injection moulding compound, wherein at least one part of pre-manifold (2) is arranged between adjacent main manifolds (11, 12, 13, 14), with the hot runners (7, 17) of the pre-manifold (2) and of the main manifolds (11, 12, 13, 14) opening through lateral surfaces of pre-manifold (15) and a main manifold (25) that face one another and are in contact with one another, with the main manifolds (11, 12, 13, 14) and pre-manifolds (2) pressed together firmly and tightly at the lateral surfaces by lateral spring elements (6), where the spring elements (6) permit a limited movement of the main manifolds (11, 12, 13, 14) by overcoming the force of a spring element (6).

2. A hot runner manifold system according to claim 1, wherein at least two separate main manifolds are provided which are arranged on opposite long sides of an oblong pre-manifold (2).

3. The hot runner manifold of claim 1 wherein at least four separate main manifolds are provided, two of which are arranged on one long side of the pre-manifold and two of which are arranged on a second opposite long side of the pre-manifold.

4. A hot runner manifold system according to claim 1 wherein the main manifolds (11, 12, 13, 14) and the pre-manifolds (2) are arranged inside a stable, surrounding frame (10), which serves as a support for the spring elements (6).

5. A hot runner manifold system according to claim 2 wherein the main manifolds (11, 12, 13, 14) and the pre-manifolds (2) are arranged inside a stable, surrounding frame (10), which serves as a support for the spring elements (6).

6. A hot runner manifold system according to claim 1 wherein each main manifold has, on one of its sides, a through-hole that is arranged centrally relative to that side.

7. A hot runner manifold system according to claim 1, wherein the pre-manifold (2) is a sliding fit in the lengthwise direction on the lateral surfaces (25) of the main manifolds (11, 12, 13, 14).

8. A hot runner manifold system according to claim 2, wherein the pre-manifold (2) is a sliding fit in the lengthwise direction on the lateral surfaces (25) of the main manifolds (11, 12, 13, 14).

9. A hot runner manifold system according to claim 3, wherein the pre-manifold (2) is a sliding fit in the lengthwise direction on the lateral surfaces (25) of the main manifolds (11, 12, 13, 14).

10. A hot runner manifold system according to claim 1, wherein the lateral through-holes lead via a channel (17) to the centre of the respective main manifold (11, 12, 13, 14), from where additional channels (19, 21, 23) lead to the injection orifices in such a way that a flow path from the centre of the main manifold (11, 12, 13, 14) to all injection orifices is substantially of equal length.

11. A hot runner manifold system according to claim 2, wherein the lateral through-holes lead via a channel (17) to the centre of the respective main manifold (11, 12, 13, 14), from where additional channels (19, 21, 23) lead to the injection orifices in such a way that a flow path from the centre of the main manifold (11, 12, 13, 14) to all injection orifices is substantially of equal length.

12. A hot runner manifold system according to claim 3, wherein the lateral through-holes lead via a channel (17) to the centre of the respective main manifold (11, 12, 13, 14), from where additional channels (19, 21, 23) lead to the injection orifices in such a way that a flow path from the centre of the main manifold (11, 12, 13, 14) to all injection orifices is substantially of equal length.

* * * * *